United States Patent
Wang et al.

(10) Patent No.: US 12,412,319 B2
(45) Date of Patent: Sep. 9, 2025

(54) METHOD AND APPARATUS FOR GENERATING VIDEO, ELECTRONIC DEVICE, AND COMPUTER PROGRAM PRODUCT

(71) Applicant: Beijing Youzhuju Network Technology Co., Ltd., Beijing (CN)

(72) Inventors: Jiawei Wang, Beijing (CN); Yuchen Zhang, Beijing (CN); Jiaxin Zou, Beijing (CN); Yan Zeng, Beijing (CN); Guoqiang Wei, Beijing (CN); Liping Yuan, Beijing (CN); Hang Li, Beijing (CN)

(73) Assignee: Beijing Youzhuju Network Technology Co., Ltd., Beijing (CN)

(*) Notice: Subject to any disclaimer, the term of this patent is extended or adjusted under 35 U.S.C. 154(b) by 0 days.

(21) Appl. No.: 18/774,561

(22) Filed: Jul. 16, 2024

(65) Prior Publication Data

US 2025/0245867 A1 Jul. 31, 2025

(30) Foreign Application Priority Data

Jan. 30, 2024 (CN) .......................... 202410132635.0

(51) Int. Cl.
*G06T 11/00* (2006.01)
*G06T 7/11* (2017.01)

(52) U.S. Cl.
CPC ................ *G06T 11/00* (2013.01); *G06T 7/11* (2017.01); *G06T 2211/441* (2023.08)

(58) Field of Classification Search
CPC ....... G06T 11/00; G06T 7/11; G06T 2211/441
USPC ......................................................... 345/418
See application file for complete search history.

(56) References Cited

U.S. PATENT DOCUMENTS

| 8,327,418 B2 * | 12/2012 | Lee ...................... H04L 12/1881 370/466 |
| 2009/0290071 A1 * | 11/2009 | Feng ..................... H03L 7/0812 348/725 |
| 2017/0161591 A1 * | 6/2017 | English ................ G06V 10/454 |
| 2018/0184062 A1 * | 6/2018 | Hariri .................... H04N 23/62 |
| 2022/0309279 A1 | 9/2022 | Biswas et al. |

(Continued)

FOREIGN PATENT DOCUMENTS

| CN | 115620371 A | 1/2023 |
| CN | 116233491 A | 6/2023 |

(Continued)

OTHER PUBLICATIONS

European Patent Office, Extended European Search Report Issued in Application No. 24188994.8, Dec. 5, 2024, Germany, 10 pages.

(Continued)

*Primary Examiner* — Sheree N Brown
(74) *Attorney, Agent, or Firm* — Alleman Hall & Tuttle LLP

(57) ABSTRACT

The present disclosure relates to a method and apparatus for generating a video, an electronic device, and a computer program product. The method includes obtaining a visual token for generating an image frame in the video. The method further includes obtaining a control token for constraining position information of an object in the image frame. In addition, the method also includes generating the image frame in the video based on the visual token and the control token, where the object in the image frame satisfies the position information.

20 Claims, 12 Drawing Sheets

(56) References Cited

U.S. PATENT DOCUMENTS

| | | | |
|---|---|---|---|
| 2023/0319321 A1 | 10/2023 | Ickin et al. | |
| 2023/0410483 A1* | 12/2023 | Chen | G06N 3/045 |
| 2024/0119731 A1* | 4/2024 | Hammer | G06V 40/23 |

FOREIGN PATENT DOCUMENTS

| | | |
|---|---|---|
| CN | 116320216 A | 6/2023 |
| CN | 116664726 A | 8/2023 |
| CN | 116863003 A | 10/2023 |
| WO | 2012154618 A2 | 11/2012 |
| WO | 2022270660 A1 | 12/2022 |

OTHER PUBLICATIONS

Marwah et al., "Attentive Semantic Video Generation using Captions," Proceedings of "2017 IEEE International Conference on Computer Vision", Oct. 22, 2017, Venice, Italy, 9 pages.

Chen C., et al., "Motion-Zero: Zero-Shot Moving Object Control Framework for Diffusion-Based Video Generation," arXiv.org, Jan. 18, 2024, https://arxiv.org/abs/2401.10150 [online], 14 Pages.

Decision of Refusal for Japanese Application No. 2024-114360, mailed May 20, 2025, 08 pages.

\* cited by examiner

METHOD AND APPARATUS FOR GENERATING VIDEO, ELECTRONIC DEVICE, AND COMPUTER PROGRAM PRODUCT

CROSS-REFERENCE TO RELATED APPLICATION(S)

This application claims priority to Chinese Application No. 202410132635.0 filed on Jan. 30, 2024, the disclosure of which is incorporated herein by reference in its entity.

FIELD

The present disclosure generally relates to the field of artificial intelligence, and more specifically, relates to a method and apparatus for generating a video, an electronic device, and a computer program product.

BACKGROUND

Text-guided video generation is a technology that utilizes text descriptions to guide the generation of video content. In the video generation task, a model receives text descriptions in a natural language form, generates image frames corresponding to texts based on these descriptions, and then combines these image frames into a video. One of the key challenges for the task is to establish a correlation between the text descriptions and the video content, including understanding objects, actions, time-space relationships, etc., in the text descriptions, and then converting these information into a series of image frames.

Motion control, for example, refers to controlling the motion of objects, scenes, and a camera in the generated video through the text descriptions. For example, the text descriptions can include information about the motion of objects or characters, and therefore it is necessary to control the objects or the characters in the generated video to move according to the text descriptions. In the related art, a machine learning model is often used to achieve motion control in the video generation task.

SUMMARY

In a first aspect of embodiments of the present disclosure, a method for generating a video is provided. The method includes obtaining a visual token for generating an image frame in the video. The method further includes obtaining a control token for constraining position information of an object in the image frame. In addition, the method also includes generating the image frame in the video based on the visual token and the control token, where the object in the image frame satisfies the position information.

In a second aspect of the embodiments of the present disclosure, an apparatus for generating a video is provided. The apparatus includes a visual token obtaining module, configured to obtain a visual token for generating an image frame in the video. The apparatus further includes a control token obtaining module, configured to obtain a control token for constraining position information of an object in the image frame. In addition, the apparatus also includes a video image generation module, configured to generate the image frame in the video based on the visual token and the control token, where the object in the image frame satisfies the position information.

In a third aspect of the embodiments of the present disclosure, an electronic device is provided. The electronic device includes one or more processors; and a storage apparatus, configured to store one or more programs. The one or more programs, when executed by the one or more processors, cause the one or more processors to implement the method for generating a video. The method includes obtaining a visual token for generating an image frame in the video. The method further includes obtaining a control token for constraining position information of an object in the image frame. In addition, the method also includes generating the image frame in the video based on the visual token and the control token, where the object in the image frame satisfies the position information.

In a fourth aspect of the embodiments of the present disclosure, a computer program product is provided. The computer program product is tangibly stored on a non-transitory computer-readable medium and includes machine-executable instructions, and the machine-executable instructions, when executed, cause a machine to implement the method for generating a video. The method includes obtaining a visual token for generating an image frame in the video. The method further includes obtaining a control token for constraining position information of an object in the image frame. In addition, the method also includes generating the image frame in the video based on the visual token and the control token, where the object in the image frame satisfies the position information.

The section Summary is provided to introduce concept selection in a simplified form, which will be further described in the following specific implementations. The section Summary is not intended to identify key or essential features of the subject claimed for protection, nor is it intended to limit the scope of the subject claimed for protection.

BRIEF DESCRIPTION OF THE DRAWINGS

The above and other features, advantages, and aspects of various embodiments of the present disclosure will become more apparent in conjunction with the accompanying drawings and with reference to following detailed descriptions. In the accompanying drawings, the same or similar reference numerals denote the same or similar elements.

DETAILED DESCRIPTION OF EMBODIMENTS

Figure 1:
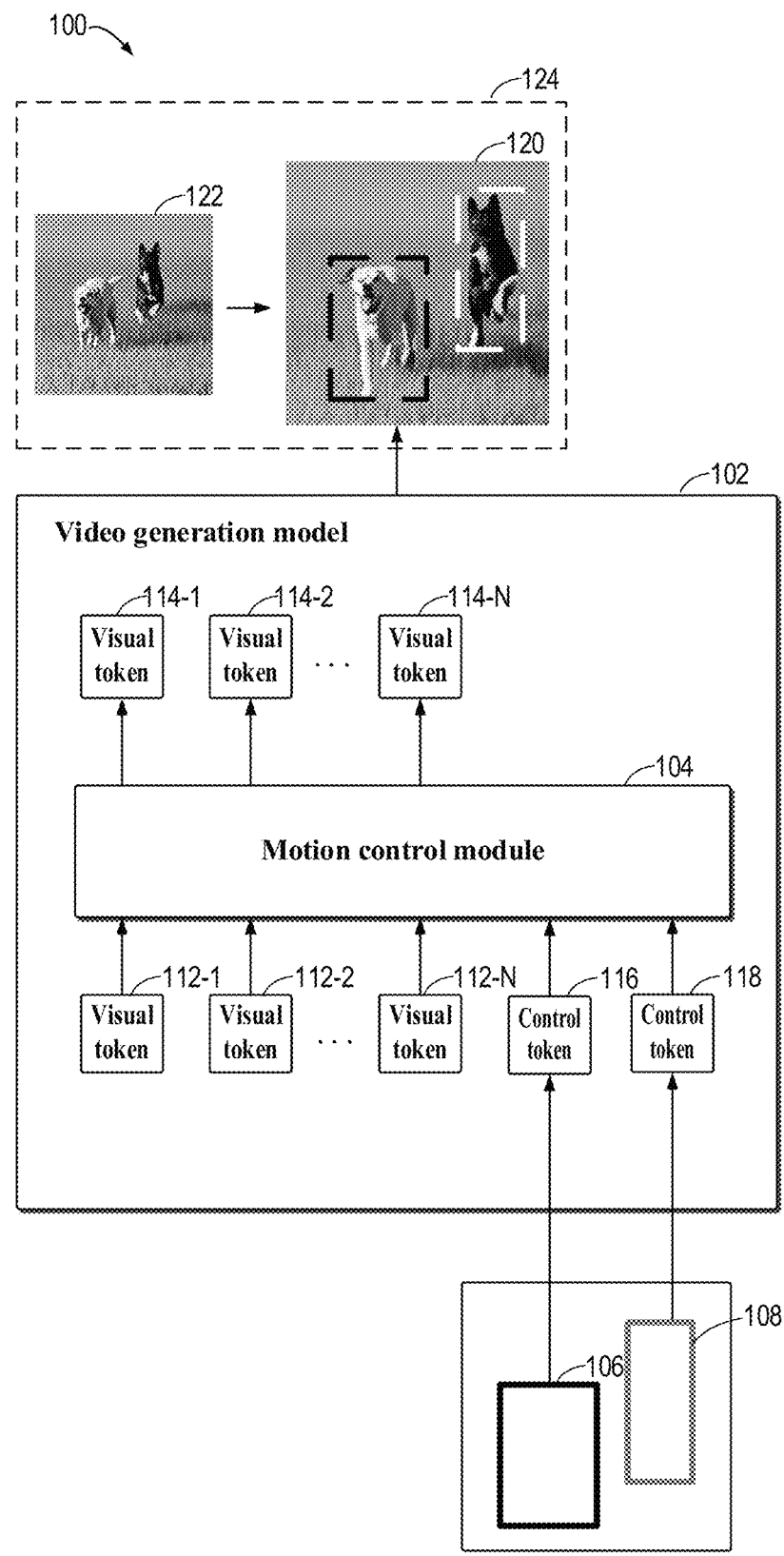
FIG. 1 illustrates a schematic diagram of an example environment where a plurality of embodiments of the present disclosure may be implemented.

It should be understood that all user-related data involved in the technical solution should be obtained and used after user authorization, which means that in the technical solution, if personal information of a user needs to be used, explicit consent and authorization from the user are required before obtaining these data, otherwise, relevant data collection and use will not be carried out. It should also be understood that when the technical solution is implemented, relevant laws and regulations should be strictly followed in the process of data collection, use, and storage, and necessary technologies and measures should be taken to ensure the security of user data and the safe use of data.

The embodiments of the present disclosure will be described in more detail below with reference to the accompanying drawings. Although the accompanying drawings show some embodiments of the present disclosure, it should be understood that the present disclosure may be implemented in various forms, and should not be construed as being limited to the embodiments stated herein. On the contrary, these embodiments are provided for a more thorough and complete understanding of the present disclosure. It should be understood that the accompanying drawings and the embodiments of the present disclosure are for exemplary purposes only, and are not intended to limit the scope of protection of the present disclosure.

In the description of the embodiments of the present disclosure, the term "include" and similar terms thereof should be understood as open-ended inclusions, that is, "including but not limited to". The term "based on" should be understood as "at least partially based on". The term "an embodiment" or "this embodiment" should be understood as "at least one embodiment". The terms "first", "second", etc. may refer to different or identical objects, unless otherwise explicitly specified. Other explicit and implicit definitions may also be included below.

With the development of video generation technology, some video generation models may generate videos based on text prompts or key image frames. As an example of a video generation model, a video diffusion model is an extension of an image diffusion model, which incorporates an architecture of a U network (U-Net) model from an image model and adds temporal layers facilitating the generation of a plurality of image frames. A text-to-video (T2V) diffusion model is often a basis for various forms of video generation models with constraint conditions. In the text-to-video diffusion model, image frames may be created based on text descriptions, and then a video may be generated based on the text descriptions and the pre-generated image frames. The method allows the video generation model to use static images as references, thereby focusing on a dynamic aspect of video generation, and then improving the quality of the generated video.

It should be understood that for ease of description, some embodiments herein use a video diffusion model with a U-Net architecture as an example, but are not intended to limit the specific architecture of the video generation model. The solution provided in the present disclosure may be applied to any video generation model that generates visual tokens and generates image frames based on the visual tokens.

In some usage scenarios, a user hopes to provide information about a motion mode of an object in a generated video by inputting text descriptions. For example, the user may provide a captured reference image with a building and then input a text description like "Tilt a camera upward and reveal the top of the building". In this case, the user expects that in the generated video, the camera gradually tilts upward from the perspective of shooting the ground and finally captures the top of the building. However, in the related art, although it is possible to generate a video with a high-quality screen and a slowly moving camera shot based on the reference image and the text description provided by the user, a model cannot well understand the requirements of the user for the motion mode of the object in the video, and as a result, the top of the building cannot be accurately revealed in the generated video.

Additionally, in some usage scenarios, when the user has precise requirements for the motion mode, it is difficult to accurately describe a desired screen through language. For example, when the user expects a video in which two puppies are running towards the camera, with one white puppy getting closer to the camera and running to the center of a screen, filling one-third of the screen at that point. Simultaneously, the other black puppy is also approaching the camera, but running towards a toy beside the camera, and as a result, is increasingly deviating from the center of the screen and finally disappearing from the right side of the screen. It is very difficult for an ordinary user to accurately describe such motion requirements, making it impossible to generate the desired video.

In view of this, an embodiment of the present disclosure provides a solution for generating a video. In the solution, the user may provide bounding boxes for constraining positions and sizes of objects in the video. The video generation model may obtain a set of visual tokens for generating image frames and control tokens for the provided bounding boxes, and then generate the image frames based on the visual tokens and the control tokens. In the generated image frames, the objects in the video will appear within the bounding boxes.

In this way, the video generation model may understand, using the control token of the bounding box, a position and a size where the user expects a target object to move, thereby using the control token to constrain the content of the generated image frame. Accordingly, the user may simply and accurately express a desired object motion mode. In addition, compared with providing only text descriptions or reference images, the method can improve a matching degree between the generated video and user requirements, thereby improving user experience.

FIG. 1 illustrates a schematic diagram of an example environment 100 where a plurality of embodiments of the present disclosure may be implemented. As shown in FIG. 1, the environment 100 includes a video generation model 102. The video generation model 102 is also referred to as a base model herein, which may be the video diffusion model described above and used to generate a video based on text descriptions or key image frames, or other machine learning models implemented using the neural network technology and used to generate a video. The environment 100 further includes a motion control module 104, which may be combined with the video generation model 102 in the form of a plug-in, thereby enhancing the motion control capability of the video generation model 102. As shown in FIG. 1, the video generation model 102 may generate visual tokens 112-1, 112-2, . . . , and 112-N(collectively referred to as visual tokens 112). These visual tokens 112 are a set of vectors generated based on information such as text descriptions and reference images, and include information about images to be generated.

As shown in FIG. 1, the environment 100 includes bounding boxes 106 and 108. The bounding boxes 106 and 108 are used to constrain positions and sizes of objects in the video in an image frame to be generated. In this embodiment of the present disclosure, the term "object" may be an independent object (e.g., a puppy), a part of an independent object (e.g., a human hand), or a plurality of objects combined (e.g., a person riding a horse). In addition, the term "motion" may be a motion of the object relative to a camera (or lens), or a motion of the camera relative to the object. For example, when the bounding box 106 or 108 indicates the position and the size after the object moves, an object with the independent motion capability (e.g., a puppy and a car) can move independently to a specified position, and is presented in a specified size. For an object that cannot independently move (e.g., a rock and a building), the object may be presented to a specified position with a specified size in a screen by moving the camera. In some embodiments, the bounding boxes such as the bounding boxes 106 and 108 are rectangular boxes, and two types of bounding boxes: a hard bounding box and a soft bounding box may be achieved. The hard bounding box is used to specify a specific position and a specific size of an object, indicating that in a generated image frame, the object is generated at coordinates specified by the hard bounding box (e.g., center coordinates of the bounding box), and the size of the object corresponds to a size of the hard bounding box. The soft bounding box is used to specify a position range and a size range of an object, indicating that in a generated image frame, the object is generated within a range defined by the soft bounding box, and the size of the object does not exceed the range.

In the environment 100, the bounding box 106 is processed into a control token 116, the bounding box 108 is processed into a control token 118, and therefore the control tokens 116 and 118 respectively include motion control information about objects corresponding to the bounding boxes 106 and 108. Then, the motion control module 104 may generate new visual tokens 114-1, 114-2, . . . , and 114-N(collectively referred to as visual tokens 114) based on the visual tokens 112, the control token 116, and the control token 118. Accordingly, the visual tokens 114 may include motion control information provided by the bounding boxes 106 and 108. Then, the video generation model 102 may generate an image frame 120 based on the visual tokens 114. In the image frame 120, the two puppies move from positions in a previous image frame 122 to positions specified by the bounding boxes 106 and 108, the size of the white puppy corresponds to the bounding box 106, and the size of the black puppy corresponds to the bounding box 108. Then, a video 124 may be formed by a plurality of image frames such as the image frames 120 and 122.

In this way, the motion control module 104 may use the control tokens 116 and 118 of the bounding boxes 106 and 108 to provide the motion control information for the video generation model 102, thereby improving a motion effect of the generated video, enhancing a matching degree between the video and user requirements, and enriching user experience.

Figure 2:
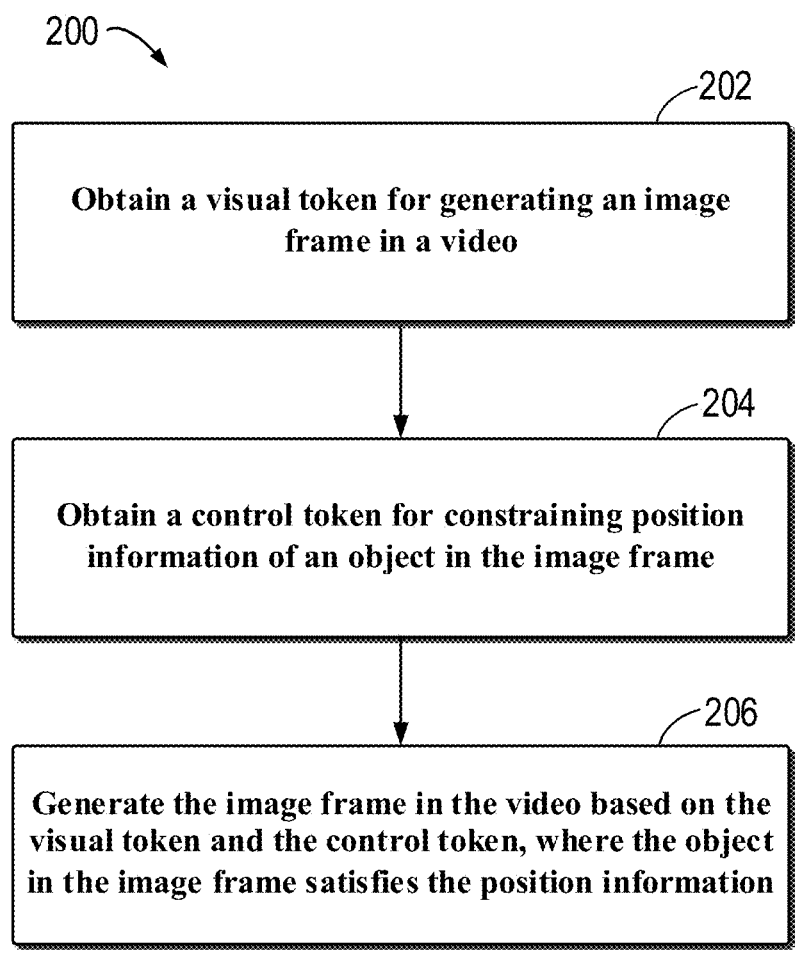
FIG. 2 illustrates a flowchart of a method for generating a video according to some embodiments of the present disclosure.

FIG. 2 illustrates a flowchart of a method 200 for generating a video according to some embodiments of the present disclosure. As shown in FIG. 2, at a block 202, the method 200 may include obtaining a visual token for generating an image frame in the video. For example, in the environment 100 shown in FIG. 1, the motion control module 104 may obtain the visual token 112, and the visual token 112 is generated by the video generation model 102 based on information such as a text description or a reference image, and includes visual information of an image frame to be generated and is used to generate the image frame 120.

At a block 204, the method 200 may include obtaining a control token for constraining position information of an object in the image frame. The position information may be information associated with the position, such as a bounding box, a contour, a coordinate value, and a coordinate range. For example, in the environment 100 shown in FIG. 1, the motion control module 104 may obtain the control tokens 116 and 118, the control tokens 116 and 118 are generated based on the bounding boxes 106 and 108, and therefore the control tokens 116 and 118 include the motion control information of the bounding boxes 106 and 108. The bounding boxes 106 and 108 may constrain positions and sizes of the objects in the image frame to be generated, thereby achieving a function of controlling the motion of the objects.

At a block 206, the method 200 may include generating the image frame in the video based on the visual token and the control token, where the object in the image frame satisfies the position information. For example, in the environment 100 shown in FIG. 1, the motion control module 104 may generate the visual token 114 based on the visual token 112, the control token 116, and the control token 118, and then, the video generation model 102 generates the image frame 120 based on the visual token 114. In the image frame 120, the two puppies appear within ranges constrained by the bounding boxes 106 and 108. Depending on different embodiments, the positions of the two puppies may precisely correspond to the positions of the bounding boxes 106 and 108, or may be within the ranges constrained by the bounding boxes 106 and 108.

In this way, the method 200 can utilize the control tokens generated based on the bounding boxes to understand the positions where the user expects target objects to move, thereby utilizing the control tokens to constrain the content of the generated image frame. Accordingly, the user may simply and accurately express a desired object motion mode. In addition, compared with providing only text descriptions or reference images, the method can improve a motion effect of the generated video, and improve a matching degree between the generated video and user requirements, thereby improving user experience.

In some embodiments, the position information is a bounding box, and in order to obtain a control token of the bounding box, coordinates of the bounding box in the image frame may be determined, and the control token is generated based on the coordinates. In some embodiments, using a plurality of bounding boxes is supported to constrain motion modes of a plurality of objects. In these embodiments, based on a color of the bounding box, an object identifier for the bounding box may be generated, and a control token is generated based on coordinates and the object identifier. In some embodiments, a hard bounding box (also referred to as a first-type bounding box herein) and a soft bounding box (also referred to as a second-type bounding box herein) may be supported at the same time. In these embodiments, the type of the bounding box may be determined, where the types of bounding boxes include the hard bounding box that constrains a specific position and a specific size of an object to be generated, and the soft bounding box that constrains a position range and a size range of the object to be generated. The control token is generated based on the coordinates, the object identifier, and the type.

In some embodiments, in response to the type of the bounding box being the hard bounding box, a center position of the object is consistent with a center position of the bounding box, and a size of the object corresponds to a size of the bounding box. In some embodiments, in response to the type of the bounding box being the soft bounding box, the center position of the object is within the bounding box, and the size of the object does not exceed the bounding box. In some embodiments, a plurality of embeddings may be generated based on coordinates, an object identifier, and a type. Based on the plurality of embeddings, a control token is generated using a multilayer perceptron. In some embodiments, a second set of visual tokens are generated based on a first set of visual tokens and control tokens, where the number of visual tokens in the first set of visual tokens is the same as the number of visual tokens in the second set of visual tokens.

Figure 3:
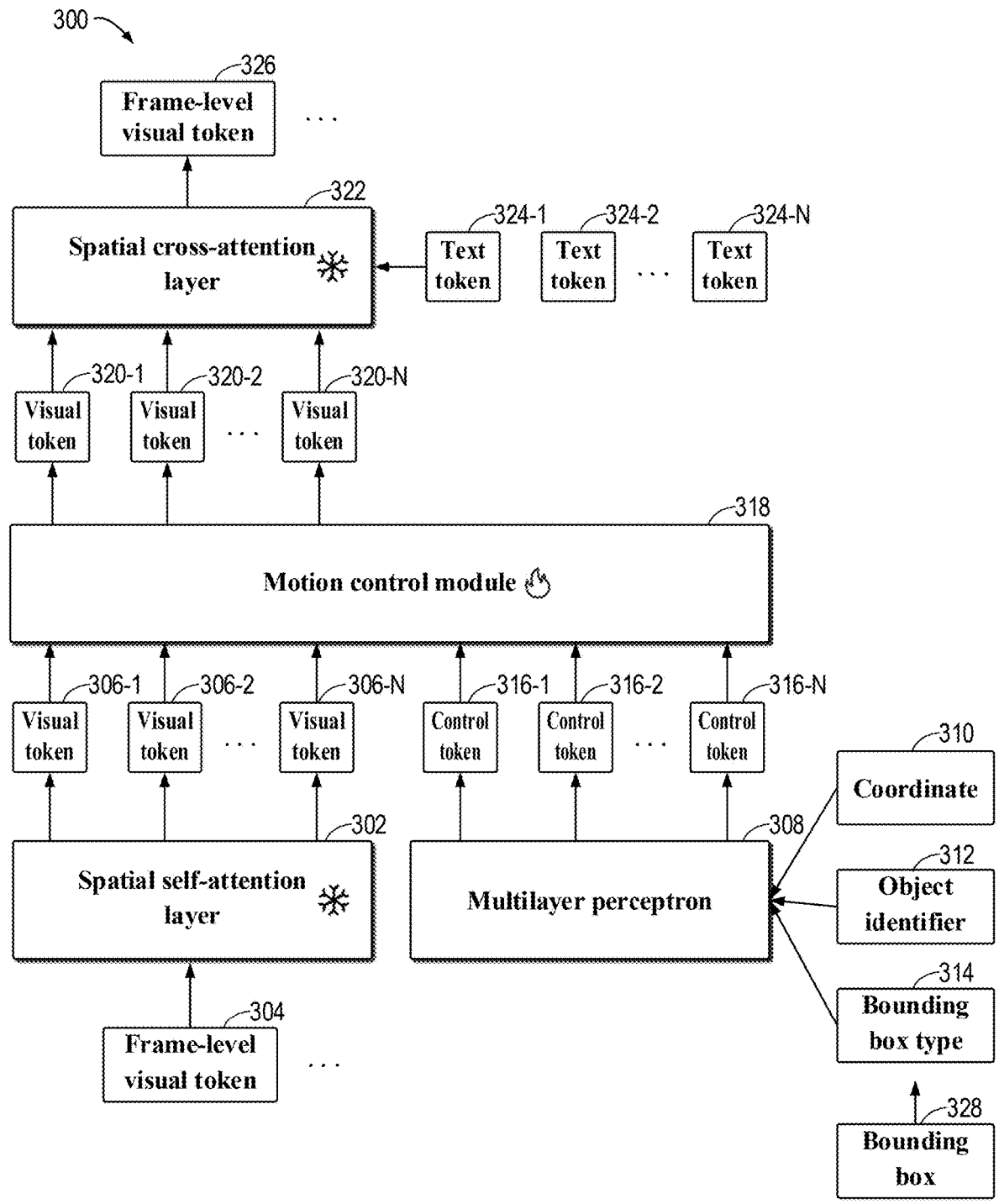
FIG. 3 illustrates a schematic diagram of an example architecture for generating a video according to some embodiments of the present disclosure.

FIG. 3 illustrates a schematic diagram of an example architecture 300 for generating a video according to some embodiments of the present disclosure. As shown in FIG. 3, the architecture 300 includes a spatial self-attention layer 302, a multilayer perceptron 308, a motion control module 318, and a spatial cross-attention layer 322. The spatial self-attention layer 302 and the spatial cross-attention layer 322 may be, for example, modules within a video diffusion model (e.g., the video generation model 102 in FIG. 1 may be the video diffusion model) based on a three-dimensional (3D) U-Net architecture. The video diffusion model may iteratively predict a noise vector in a noisy video input, thereby gradually converting pure Gaussian noise into a high-quality video frame. The 3D U-Net is composed of alternating convolutional blocks and attention blocks. Each block includes two components: a spatial component that processes each image frame as a separate image, and a temporal component that facilitates information exchange between image frames. In each attention block, the spatial component typically includes a self-attention layer, followed by a cross-attention layer, where the cross-attention layer is used to adjust video generation based on text prompts. The motion control module is inserted between the two attention layers, thereby allowing the model to manage motion control in the video generation.

As shown in FIG. 3, in the architecture 300, the motion control module 318 is inserted between the spatial self-attention layer 302 and the spatial cross-attention layer 322 of an original video diffusion model. The spatial self-attention layer 302 receives frame-level visual tokens 304 and generates visual tokens 306-1, 306-2, ..., and 306-N (collectively referred to as visual tokens 306) based on the frame-level visual tokens 304. The motion control module 318 receives the visual tokens 306 and control tokens 316-1, 316-2, ..., and 316-N(collectively referred to as control tokens 316) as inputs, and outputs visual tokens 320-1, 320-2, ..., and 320-N(collectively referred to as visual tokens 320). Each of the control tokens 316 corresponds to the corresponding object (or the bounding box). Since the control tokens 316 include the motion control information provided by the bounding boxes, the newly generated visual tokens 320 also include the motion control information provided by the bounding boxes. Then, the visual tokens 320 are inputted into the spatial cross-attention layer 322, and the spatial cross-attention layer 322 may generate frame-level visual tokens 326 based on the visual tokens 320 and text tokens 324-1, 324-2, ..., and 324-N (collectively referred to as text tokens 324). Then, the video diffusion model may generate image frames based on the frame-level visual tokens 326. In order not to change an original structure of the spatial cross-attention layer 322, the number of the visual tokens 306 may be kept the same as the number of the visual tokens 320. In this way, by fixing parameters of the original video diffusion model (including the spatial self-attention layer 302 and the spatial cross-attention layer 322) in a training stage and only adjusting parameters of the motion control module 318, retraining caused by modifying the structure of the video diffusion model can be avoided, thereby saving costs, and avoiding accuracy degradation of the original video diffusion model caused by retraining.

In the architecture 300, if v is used to represent the frame-level visual token 304 of the image frame to be generated, $h_{text}$ is used to represent a sequence of text tokens 324, and $h_{box}$ is used to represent a sequence of control tokens 316, an enhanced spatial attention block may be described by the following equations (1) to (3):

$$v = v + \text{SelfAttn}(v) \quad (1)$$

$$v = v + TS(\text{SelfAttn}([v, h_{box}])) \quad (2)$$

$$v = v + \text{CrossAttn}(v, h_{text}) \quad (3)$$

where TS(·) denotes a token selection operation specifically considering visual tokens, SelfAttn represents the spatial self-attention layer 302, and CrossAttn represents the spatial cross-attention layer 322.

In the architecture 300, the number of the control tokens 316 depends on the number of bounding boxes that simultaneously exist in a single image frame supported by the video generation model, and the control tokens 316 are in one-to-one correspondence with the bounding boxes. For example, if the video generation model only supports an image frame including a bounding box for one object, there is 1 control token 316; and if the video generation model supports an image frame simultaneously including 5 bounding boxes for 5 objects, there are 5 control tokens 316. If the video generation model supports simultaneously providing 5 bounding boxes in an image frame, but only the motion of two objects needs to be controlled in a video to be generated (i.e., only providing 2 bounding boxes), the missing 3 control tokens may be filled with learnable specific tokens. In the architecture 300, the text tokens 324 are not essential. That is, if the user does not provide the text description of the video to be generated, the learnable tokens may be used to fill in the missing text tokens.

As shown in FIG. 3, to generate the control token 316, coordinates 310 of a bounding box 328, an object identifier 312 used to identify uniqueness of the bounding box 328 (or an object corresponding to the bounding box 328), and a bounding box type 314 may be determined. Each control token 316 may be defined by the following equation (4):

$$t_b = MLP(\text{Fourier}([b_{loc}, b_{id}, b_{flag}])) \qquad (4)$$

where $b_{loc}$ represents a 4-dimensional vector including top-left coordinates and bottom-right coordinates of the bounding box (i.e., coordinates 310), normalized between 0 and 1. $b_{id}$ represents the object identifier 312, which is used to identify and link bounding boxes between various image frames. $b_{flag}$ represents the bounding box type 314, for example, 1 represents the hard bounding box, and 0 represents the soft bounding box. In addition, Fourier represents a Fourier embedding operation, and MLP represents the multilayer perceptron. In this way, the multilayer perceptron may be utilized to allow the control token to include higher-level and more abstract semantic features, thereby improving the performance of the motion control module 318 and improving a motion effect of the generated image frame.

In some embodiments, $b_{id}$ may be represented in a color RGB space, where each object corresponds to a bounding box with a unique color, making $b_{id}$ a vector with a 3-dimensional RGB value normalized between 0 and 1. $b_{loc}$, $b_{id}$, and $b_{flag}$ are concatenated into a vector, and a corresponding embedding is generated via the Fourier embedding operation. Then, the embedding is inputted into the multilayer perceptron 308 to generate the control token 316. By using the RGB value to generate the object identifier, the corresponding bounding box may be generated in the image frame based on the object identifier in the training stage, thereby facilitating alignment between the generated bounding box and a ground truth bounding box, and improving a model training effect.

When $b_{loc}$, $b_{id}$, and $b_{flag}$ are encoded using Fourier embedding, it may be ensured that all inputted dimensions are scaled between 0 and 1. For any given input x within the range, the Fourier embedding is defined by the following equation (5):

$$\text{Fourier}(z) = [\cos(x \cdot 100^{0/8}), \ldots, \cos(x \cdot 100^{7/8}), \sin(x \cdot 100^{0/8}), \ldots, \sin(x \cdot 100^{7/8})] \qquad (5)$$

In some embodiments, the Fourier embedding of each input may be combined to generate an overall embedding with a dimension of 128. Then, these embeddings may be processed through the multilayer perceptron. The multilayer perceptron may have three hidden layers, with each hidden layer having a dimension of 512. Then, adjustment may be performed to output the control token to match the dimension (i.e., 1024) of the visual token.

It should be understood that although the architecture 300 illustrates generating the control token 316 based on the coordinates 310 of the bounding box 328, the object identifier 312, and the bounding box type 314, the object identifier 312 and the bounding box 314 are not essential in some embodiments. For example, in some embodiments, if only one specific type of bounding box (e.g., a hard bounding box) is supported, the control token 316 may be generated based solely on the coordinates 310. In some embodiments, if only a plurality of specific types of bounding boxes are supported, the control tokens 316 may be generated based solely on the coordinates 310 and the object identifiers 312.

In this way, the motion control module 318 may provide precise motion control information for the original video diffusion model, thereby improving the effect of the generated image frame, and allowing the object to move according to a motion mode expected by the user. In addition, because the inserted motion control module 318 does not change the structure and the parameters of the original video diffusion model, the architecture 300 may reuse the capability of the trained video diffusion model, thereby improving the motion control on the object in the video while ensuring the screen quality of the generated video.

In the training stage, to obtain a training dataset, training data meeting conditions may be extracted from existing publicly accessible video datasets. For example, each video in the existing video dataset may be evaluated, and embeddings of a starting frame and an ending frame of the video are compared. If the cosine similarity between the embeddings of the starting frame and the ending frame is lower than a preset threshold, it indicates a significant object or camera motion in the video, thereby embedding the data into the dataset to form a selected dataset.

For a video in the selected dataset, a starting frame of the video may be obtained, and an existing model is utilized to generate descriptions of content in the starting frame. Then, noun phrases (e.g., young man and white shirt) may be extracted from these descriptions to serve as object prompts. These object prompts may then be used to identify rectangular bounding boxes surrounding the object in the starting frame. Next, these bounding boxes may be tracked and propagated in all image frames of the video, thereby obtaining a large number of objects surrounded by the bounding boxes.

Figure 4:
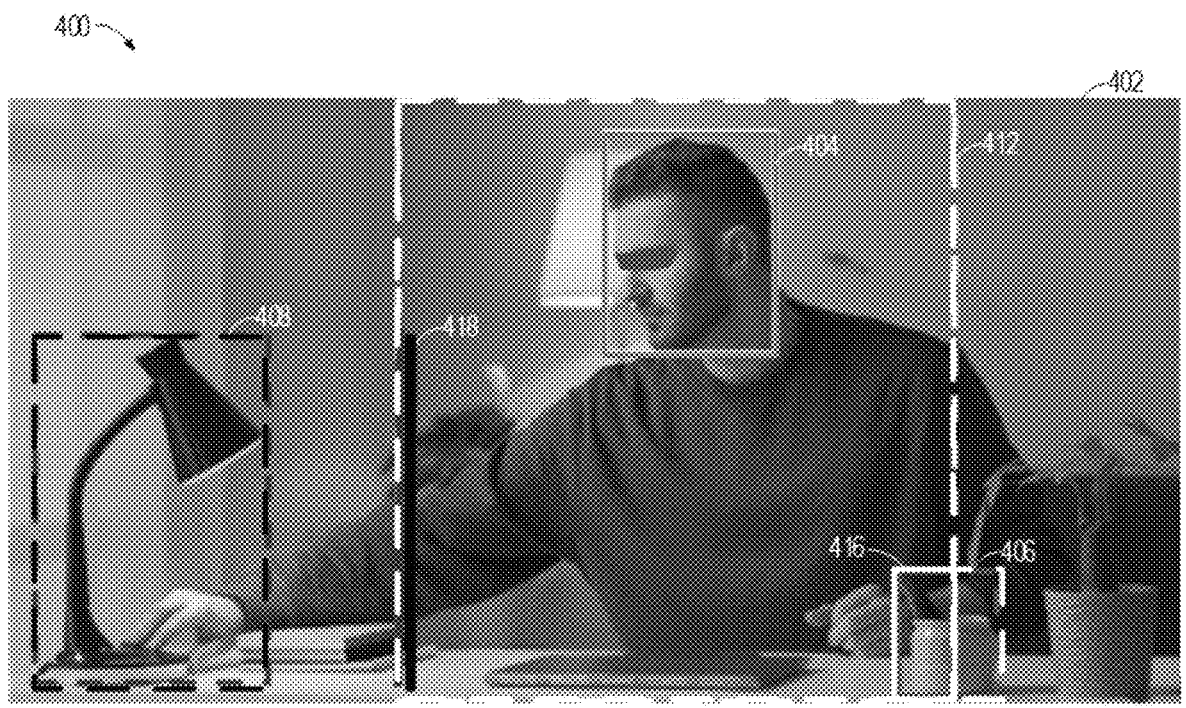
FIG. 4 illustrates a schematic diagram of an example for generating training data from an existing video dataset according to some embodiments of the present disclosure.

In the training process, the video may be randomly cropped based on a specific aspect ratio, and then all the bounding boxes are projected to a cropped area. If the bounding box is completely located outside the cropped area, the bounding box may be projected as a line segment (or an approximate line segment bounding box) along the boundary of the cropped area. FIG. 4 illustrates a schematic diagram of an example 400 for generating training data from an existing video dataset according to some embodiments of the present disclosure. As shown in FIG. 4, the example 400 includes an image 402, and the image 402 includes identified bounding boxes 404, 406, and 408. Since a size of the image 402 is wider than a size required by the video generation model, the image 402 may be cropped according to the size required by the video generation model to obtain a cropped area 412. As shown in FIG. 4, the bounding box 404 is completely located within the cropped area 412, and therefore does not need to be additionally operated. A portion of the bounding box 406 is located outside the cropped area 412, and therefore the bounding box 406 may be cropped to retain only a portion located within the cropped area 412, namely the bounding box 416. In addition, the bounding box 408 is completely located outside the cropped area 412, and therefore the bounding box 408 may projected to the bounding box 418 at the boundary of the cropped area 412, the bounding box 418 may be considered as a line segment or a rectangular box with a smaller width, and a height of the bounding box 418 is associated with a height of the bounding box 408. In the training dataset, the bounding box 418 may represent an object entering from a position outside the image frame or moving from a position within the image frame to a position outside the image frame.

In this way, a training sample used to train the motion control module of the present disclosure may be generated from the existing training dataset, and therefore the problem of lacking training data corresponding to the method for generating a video provided in the embodiments of the present disclosure. The training data generated through the method has good diversity, thereby improving a training effect.

In some embodiments, the object in the video may be annotated through three steps. In the first step, a dynamic video clip may be selected by comparing a starting frame and an ending frame of each 4-second video clip in the dataset. In some embodiments, these image frames may be processed, and cosine similarity of feature embeddings in an average pooling layer is calculated. Video clips with a similarity score below 0.65 will be retained for further processing. In the second step, for each selected video clip, three sentence descriptions of the video content may be created, and then noun phrases in these descriptions are recognized. Since most of these phrases are abstract nouns rather than specific object names, these noun phrases may be filtered, and only phrases representing the specific object names are retained. Subsequently, these filtered noun phrases may be processed to recognize initial bounding boxes in the starting frame of the video clip. Then, these bounding boxes may be tracked in subsequent frames. For each detected object, some bounding boxes may be provided, with one bounding box for each image frame in the video clip. Then, objects with no bounding boxes detected or objects with a confidence level detected to be less than a threshold in some image frames may be eliminated, thereby using a successfully tracked object as trained ground truth data.

During training, in some embodiments, the motion control module may be trained by adjusting the parameters of the motion control module while fixing parameters of the base model. In some embodiments, the motion control module may be trained by applying a self-alignment operation. The self-alignment operation includes: generating an identification image frame based on a target bounding box in the training dataset. The identification image frame includes an identification bounding box that identifies an object constrained by the target bounding box, and the motion control module is trained by aligning the identification bounding box with the target bounding box. In some embodiments, a loss between the identification bounding box and the target bounding box may be determined, and the motion control module is trained by making the loss satisfy a preset condition.

Figure 5:
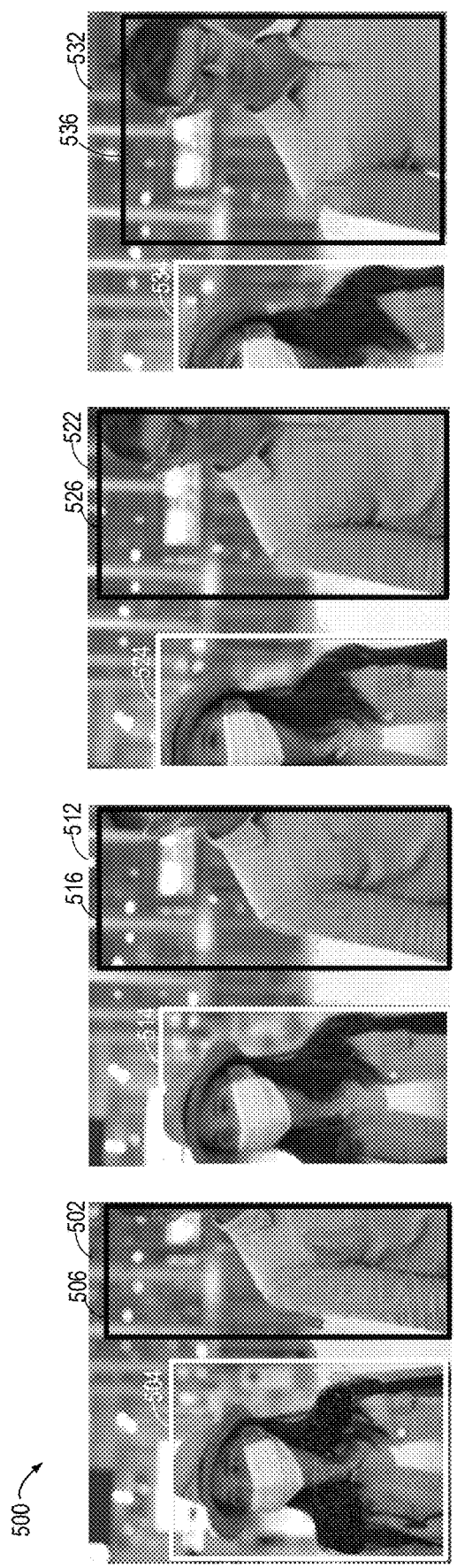
FIG. 5 illustrates a schematic diagram of an example process of a self-alignment operation according to some embodiments of the present disclosure.

FIG. 5 illustrates a schematic diagram of an example process 500 of a self-alignment operation according to some embodiments of the present disclosure. In the process 500, a model may be trained to generate bounding boxes of different colors for all encoded objects in each image frame, and colors are specified in control tokens of the objects. Through the method, the problem of associating the bounding boxes with the objects and maintaining temporal consistency between the plurality of image frames may be decomposed into two tasks easier to manage: generating a bounding box with a correct color for each object, and aligning these boxes with bounding boxes used to provide motion control information in each image frame. Therefore, it may be ensured that the bounding boxes of the same color always surround the same object in different image frames. For the hard bounding box, the model only needs to generate a bounding box at specified coordinates, while for the soft bounding box, a bounding box may be generated within a specified area. Self-aligned bounding boxes may be used as an intermediate representation, and the model may follow constraint conditions provided by the target bounding box to guide the generation of these self-aligned bounding boxes, so as to guide the generation of a visual object. After completing the training stage of performing the self-alignment operation, the same dataset may be continuously used to further train the model, thereby eliminating the bounding boxes in the generated image frame.

As shown in FIG. 5, when image frames 502, 512, 522, 532, and 542 are generated in the process 500, bounding boxes 504, 506, 514, 516, 524, 526, 534, and 536 surrounding each controlled object may be predicted, and these bounding boxes are drawn into the corresponding image frames as part of the image frames. Bounding boxes identifying the same object are represented by the same color, while bounding boxes identifying different objects are represented by different colors. For example, the bounding boxes 504, 514, 524, and 534 identifying the same object are all represented by white, the bounding boxes 506, 516, 526, and 536 identifying the same object are all represented by black, and the bounding boxes 504 and 506 identifying different objects are represented by different colors.

In this way, the self-alignment operation may effectively associate the bounding boxes with the objects and maintain temporal consistency between the plurality of frames. Further, the model may quickly learn to stop generating visible bounding boxes, but the alignment capability of these bounding boxes still exists. Therefore, the self-alignment operation may help the model establish an appropriate internal representation.

In some embodiments, a first training dataset may be obtained, and includes hard bounding boxes, and the motion control module is trained by applying the self-alignment operation based on the first training dataset. In some embodiments, a second training dataset may be generated by converting a part of the bounding boxes in the first training dataset into soft bounding boxes, and the motion control module is trained by applying the self-alignment operation based on the second training dataset. In some embodiments, based on the second training dataset, the motion control module may be trained by using the loss for the base model without applying the self-alignment operation.

Figure 6:
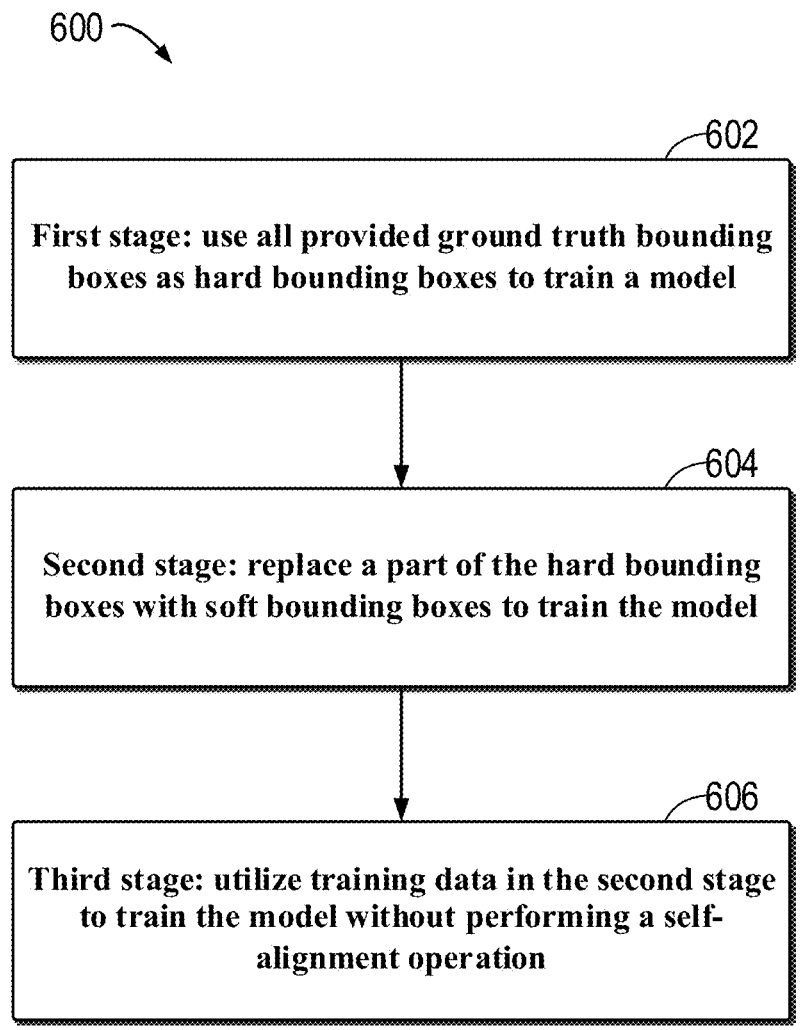
FIG. 6 illustrates a flowchart of an example process of a multi-stage training process according to some embodiments of the present disclosure.

FIG. 6 illustrates a flowchart of an example process 600 of a multi-stage training process according to some embodiments of the present disclosure. As shown in FIG. 6, a first stage is described at a block 602. In the process 600, all provided ground truth bounding boxes may be used as hard bounding boxes to train a model. Since motion control for hard bounding boxes is easier to learn than for soft bounding boxes, the stage may serve as a preliminary stage to establish an initial understanding of the model for coordinates and object identifiers.

A second stage is described at a block 604, and in the process 600, a part of the hard bounding boxes may be replaced with soft bounding boxes to train the model. For example, 80% of the hard bounding boxes may be replaced with soft bounding boxes. In the process 600, the hard bounding boxes may be independently and randomly expanded (not exceeding the boundary of the image frame) in the up, down, left, and right directions of the hard bounding boxes, and the expanded bounding boxes are used as the soft bounding boxes. In the first stage at the block 602 and the second stage at the block 604, the self-alignment operation may be applied for training.

A third stage is described at a block 606, and in the process 600, the training data in the second stage may be utilized to train the model without performing the self-alignment operation. In this way, the first stage and the second stage may effectively allow the model to have the capability of processing the hard bounding boxes and the soft bounding boxes, and in the third stage, the image frames not including the self-aligned bounding boxes may be generated. Therefore, the model training efficiency can be improved, and the self-alignment operation can be fully utilized to improve the model training effect.

Figure 7:
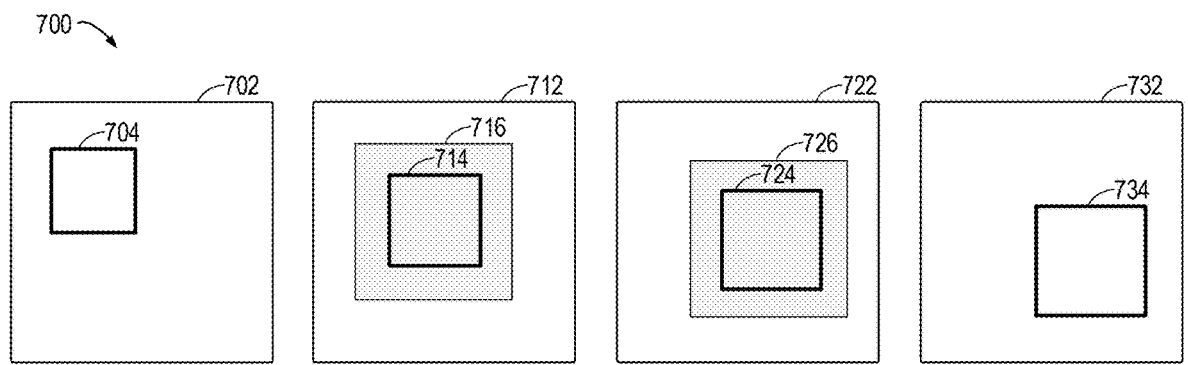
FIG. 7 illustrates a schematic diagram of an example process of generating a video by generating a hard bounding box and expanding the hard bounding box into a soft bounding box in a case of providing the hard bounding box in an ending frame according to some embodiments of the present disclosure.

FIG. 7 illustrates a schematic diagram of an example process 700 of generating a video by generating a hard bounding box and expanding the hard bounding box into a soft bounding box in a case of providing the hard bounding box in an ending frame according to some embodiments of the present disclosure. In an inference stage, the user may identify bounding boxes in a small number of image frames (e.g., in a starting frame and the ending frame). As shown in FIG. 7, in the example process 700, a bounding box 704 may be identified in a starting frame 702, and a bounding box 734 is identified in an ending frame 732, indicating that an object identified by the bounding box 704 moves from the position of the bounding box 704 to a position specified by the bounding box 734, and a size of the object in the ending frame 732 should correspond to a size of the bounding box 734. To provide more stable motion control, the soft bounding boxes may be inserted into intermediate frames 712 and 722 via the model. In some embodiments, linear interpolation between the bounding boxes 704 and 734 specified by the user may be applied to the intermediate frames 712 and 722, thereby generating hard bounding boxes 714 and 724. Then, in the process 700, the hard bounding boxes 714 and 724 may be appropriately expanded, thereby generating soft bounding boxes 716 and 726. Therefore, in the process 700, the intermediate frame 712 with the soft bounding box 716 and the intermediate frame 722 with the soft bounding box 726 may be generated.

In this way, it may be ensured that the object roughly follows an expected trajectory in the motion process, and meanwhile, the soft bounding boxes may also introduce variations for the model, thereby enhancing diversity of the generated video.

Figure 8:
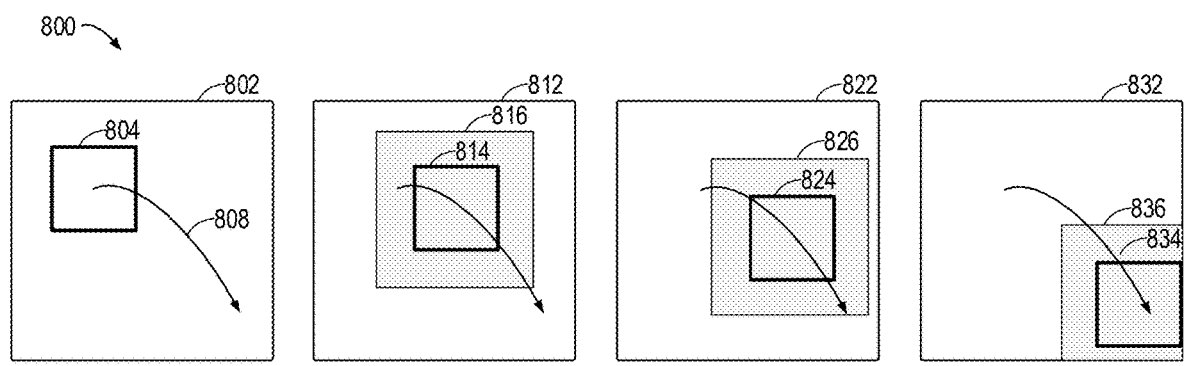
FIG. 8 illustrates a schematic diagram of an example process of generating a video by generating a hard bounding box and expanding the hard bounding box into a soft bounding box in a case of providing an object motion trajectory according to some embodiments of the present disclosure.

FIG. 8 illustrates a schematic diagram of an example process of generating a video by generating a hard bounding box and expanding the hard bounding box into a soft bounding box in a case of providing an object motion trajectory according to some embodiments of the present disclosure. As shown in FIG. 8, the user provides a bounding box 804 and a motion trajectory 808 in a starting frame 802. In the process 800, hard bounding boxes 814, 824, and 834 may be generated in subsequent image frames 812, 822, and 832 by interpolation and along the motion trajectory 808. For example, the hard bounding boxes 814, 824, and 834 may be generated by generating a hard bounding box with a center position on the motion trajectory. Then, in the process 800, the hard bounding boxes 814, 824 and 834 may be expanded, thereby generating soft bounding boxes 816, 826 and 836. Accordingly, an object identified by the bounding box 804 may move along the motion trajectory 808 into a range defined by the soft bounding box 836 in the image frame 832, and the object may be kept within ranges defined by the soft bounding boxes 816 and 826 in the image frames 812 and 822.

In this way, the user may perform more precise motion control by specifying the motion trajectory of the object, and may achieve an effect that cannot be expressed through text descriptions.

Figure 9:
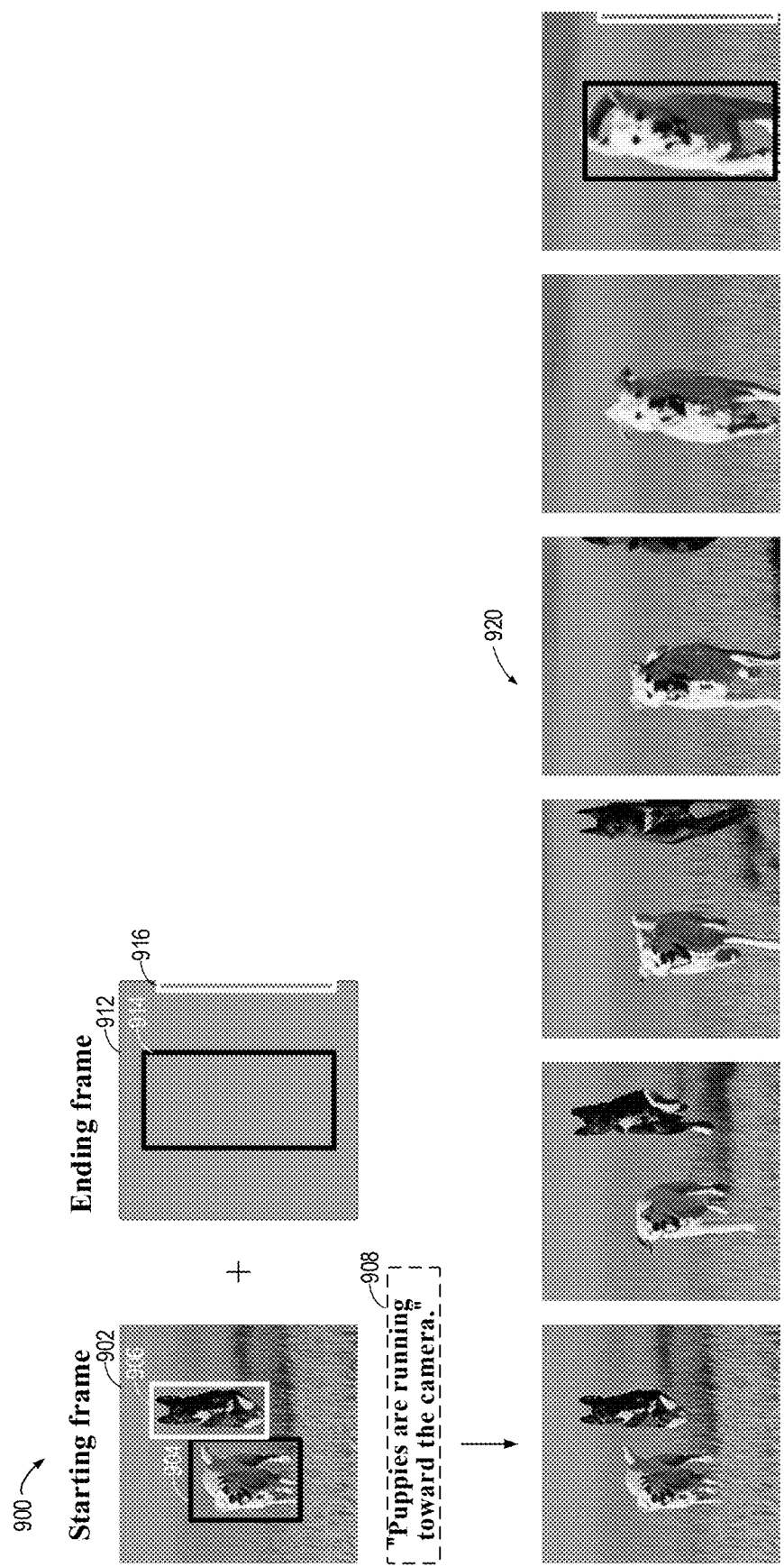
FIG. 9 illustrates a schematic diagram of an example of providing a plurality of bounding boxes in a starting frame and providing a bounding box close to a right boundary in an ending frame according to some embodiments of the present disclosure.

FIG. 9 illustrates a schematic diagram of an example 900 of providing a plurality of bounding boxes in a starting frame and providing a bounding box close to a right boundary in an ending frame according to some embodiments of the present disclosure. As shown in FIG. 9, in the example 900, a starting frame 902 and a text description 908 (i.e., "Puppies are running towards the camera") are provided, where the starting frame 902 includes a white puppy and a black puppy. In the example 900, the starting frame 902 includes a black bounding box 904 identifying the white puppy and a white bounding box 906 identifying the black puppy. In addition, an ending frame 912 includes a black hard bounding box 914 and a white hard bounding box 916, where the hard bounding box 916 is close to a right boundary of the ending frame 912 and has a narrow width (e.g., less than a threshold width), indicating that the black puppy needs to run out of the screen from the right side before the ending frame.

In the example 900, a model generates an image frame sequence 920, where the two puppies gradually run towards the camera, and the white puppy runs to a position specified by the hard bounding box 914 in the ending frame, with the size corresponding to the hard bounding box 914. Moreover, the black puppy runs out of the right boundary in the ending frame, and it can be seen that the black puppy runs into an image frame outside the right boundary, with the size corresponding to the hard bounding box 916.

Figure 10:
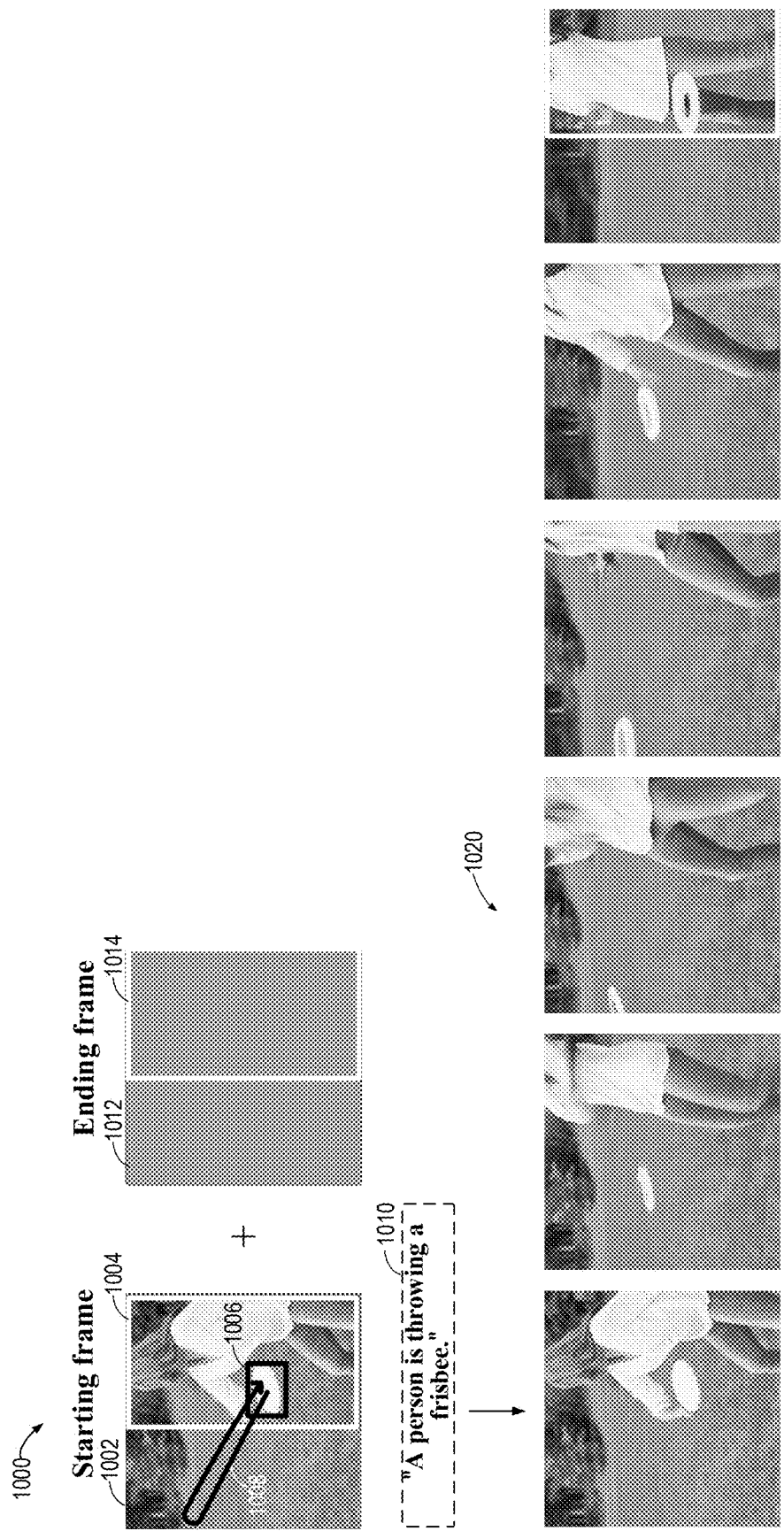
FIG. 10 illustrates a schematic diagram of an example of providing a bounding box and a motion trajectory of an object and a bounding box of another object in a starting frame and providing a bounding box of the another object in an ending frame according to some embodiments of the present disclosure.

FIG. 10 illustrates a schematic diagram of an example 1000 of providing a bounding box and a motion trajectory of an object and a bounding box of another object in a starting frame and providing a bounding box of the another object in an ending frame according to some embodiments of the present disclosure. As shown in FIG. 10, in the example 1000, a starting frame 1002 and a text description 1010 (i.e., "A person is throwing a frisbee") are provided, where the starting frame 1002 includes a person and a frisbee. In the example 1000, the starting frame 1002 includes a white hard bounding box 1004 identifying the person, a black hard bounding box 1006 identifying the frisbee, and a motion trajectory 1008 identifying a motion path of the frisbee.

In the example 1000, a model generates an image frame sequence 1020, where the person is located at a position specified by a hard bounding box 1014 in the ending frame, with the size corresponding to the hard bounding box 1014. In addition, the frisbee is thrown by the person in the image frame sequence 1020, flies along the motion trajectory 1008, and finally flies back to an endpoint position indicated by the motion trajectory 1008.

It can be seen that the motion control module may achieve precise motion control based on the bounding boxes, manage the motion of foreground and background objects, and modify the pose by adjusting smaller components of the larger object. In addition, in a scenario where a video is generated with an image as a condition, the user may easily select an object by drawing a hard bounding box around the object. Compared with text-based or language-based control, the vision-based method is easier to operate. Moreover, for an intermediate frame that lacks bounding boxes provided by the user, the motion control module may generate soft bounding boxes through an algorithm to approximate the motion trajectory. These soft bounding boxes may be constructed based on bounding boxes in the starting frame and the ending frame specified by the user, or based on bounding boxes and a motion trajectory specified by the user, thereby achieving precise motion control, and improving the user experience.

Figure 11:
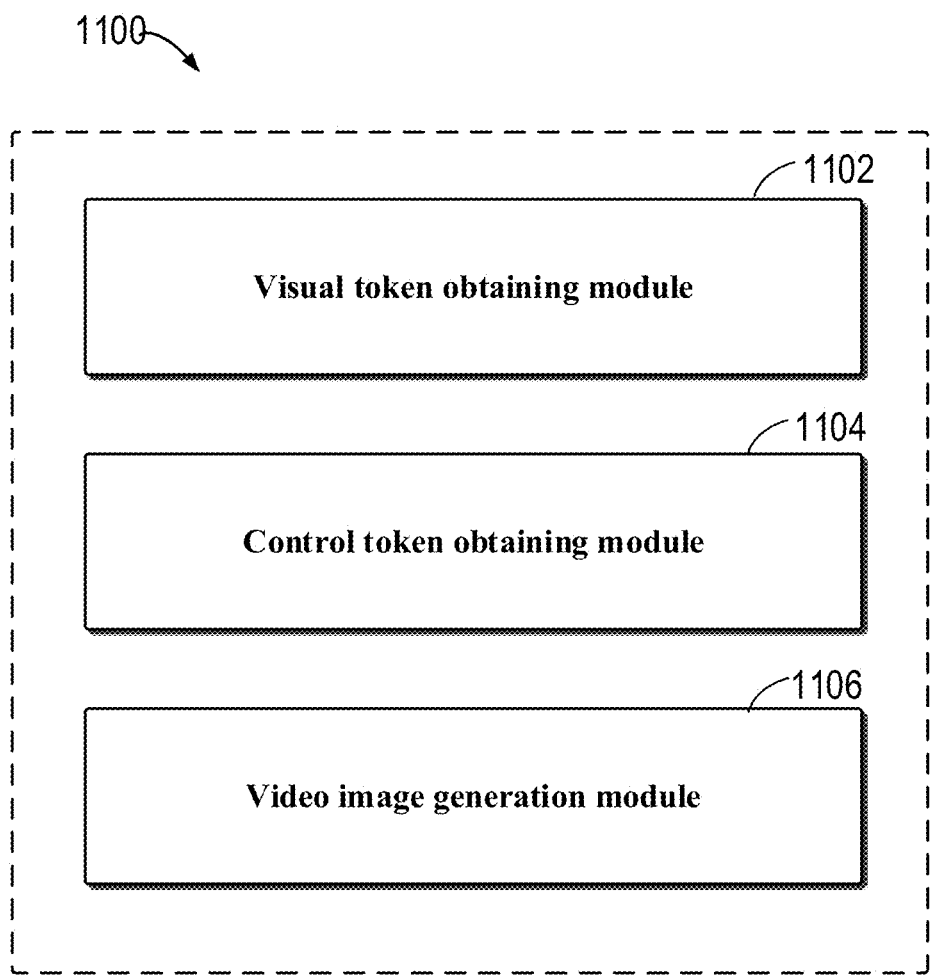
FIG. 11 illustrates a block diagram of an apparatus for generating a video according to some embodiments of the present disclosure.

FIG. 11 illustrates a block diagram of an apparatus 1100 for generating a video according to some embodiments of the present disclosure. As shown in FIG. 11, the apparatus 1100 includes a visual token obtaining module 1102, configured to obtain a visual token for generating an image frame in the video. The apparatus 1100 further includes a control token obtaining module 1104, configured to obtain a control token for constraining position information of an object in the image frame. In addition, the apparatus 1100 also includes a video image generation module 1106, configured to generate the image frame in the video based on the visual token and the control token, where the object in the image frame satisfies the position information.

It should be understood that by utilizing the apparatus 1100 in the present disclosure, at least one of the many advantages capable of being implemented in the methods or the processes described above may be achieved. For example, the apparatus 1100 may utilize the control tokens generated based on the bounding boxes to understand the positions where the user expects target objects to move, thereby utilizing the control tokens to constrain the content of the generated image frame. Accordingly, the user may simply and accurately express a desired object motion mode. In addition, compared with providing only text descriptions or reference images, the method can improve a motion effect of the generated video, and improve a matching degree between the generated video and user requirements, thereby improving user experience.

Figure 12:
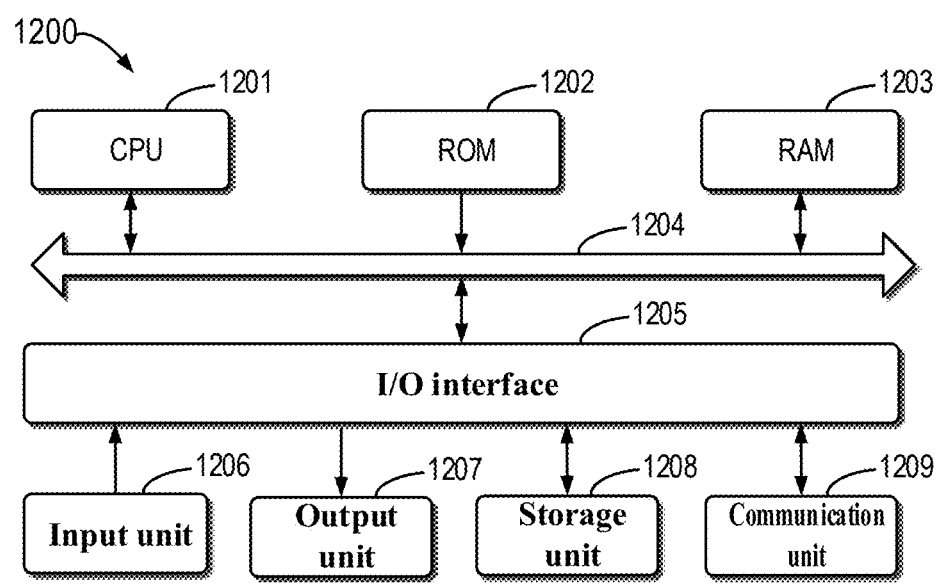
FIG. 12 illustrates a block diagram of a device capable of implementing a plurality of embodiments of the present disclosure.

FIG. 12 illustrates a block diagram of a device 1200 capable of implementing a plurality of embodiments of the present disclosure. The device 1200 may be a device or apparatus described in the embodiments of the present disclosure. As shown in FIG. 12, the device 1200 includes a central processing unit (CPU) and/or a graphics processing unit (GPU) 1201, which may perform various suitable actions and processing according to computer program instructions stored in a read-only memory (ROM) 1202 or computer program instructions loaded from a storage unit 1208 into a random access memory (RAM) 1203. The RAM 1203 may also store various programs and data required for the operation of the storage device 1200. The CPU/GPU 1201, the ROM 1202, and the RAM 1203 are connected to one another through a bus 1204. An input/output (I/O) interface 1205 is also connected to the bus 1204. Although not shown in FIG. 12, the device 1200 may also include a coprocessor.

A plurality of components in the device 1200 are connected to the I/O interface 1205, including an input unit 1206 such as a keyboard and a mouse; an output unit 1207 such as various types of displays and speakers; the storage unit 1208 such as a disk and an optical disc; and a communication unit 1209 such as a network card, a modem, and a wireless communication transceiver. The communication unit 1209 allows the device 1200 to exchange information/data with other devices through a computer network such as the Internet, and/or various telecommunication networks.

The various methods or processes described above may be performed by the CPU/GPU 1201. For example, in some embodiments, the method may be implemented as a computer software program that is tangibly included in a machine-readable medium, such as the storage unit 1208. In some embodiments, part or all of the computer program may be loaded and/or installed onto the device 1200 via the ROM 1202 and/or the communication unit 1209. When the computer program is loaded onto the RAM 1203 and executed by the CPU/GPU 1201, one or more of steps or actions of the methods or the processes described above may be performed.

In some embodiments, the methods and the processes described above may be implemented as a computer program product. The computer program product may include a computer-readable storage medium, carrying computer-readable program instructions for performing various aspects of the present disclosure.

The computer-readable storage medium may be a tangible device that may retain and store instructions used by an instruction-executing device. The computer-readable storage medium may be, for example, but is not limited to, an electric storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard drive, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, such as a punch card or a raised structure in a groove with instructions stored thereon, and any suitable combination of the above. The computer-readable storage medium used herein is not to be interpreted as transient signals, such as radio waves or other freely propagating electromagnetic waves, electromagnetic waves propagated through waveguides or other transmission media (e.g., light pulses through fiber-optic cables), or electrical signals transmitted through wires.

The computer-readable program instructions described herein may be downloaded from the computer-readable storage medium to various computing/processing devices or downloaded to an external computer or an external storage device through a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or a network interface in each computing/processing device receives the computer-readable program instructions from the network and forwards the computer-readable program instructions for storage in the computer-readable storage medium in each computing/processing device.

The computer program instructions for performing the operation of the present disclosure may be assembly instructions, instruction set architecture (ISA) instructions, machine instructions, machine-dependent instructions, microcode, firmware instructions, state setting data, or source code or object code written in any combination of one or more programming languages, where the programming languages include object-oriented programming languages and conventional procedural programming languages. The computer-readable program instructions may be executed entirely on a user computer, partly on the user computer, as a stand-alone software package, partly on the user computer and partly on a remote computer, or entirely on the remote computer or the server. In the case of involving the remote computer, the remote computer may be connected to the user computer through any type of network, including a local area network (LAN) or wide area network (WAN), or may be connected to the external computer (e.g., utilizing an Internet service provider for Internet connectivity). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or another programmable data processing apparatus, thereby producing a machine, such that these instructions, when executed by the processing unit of the computer or the another programmable data processing apparatus, produce an apparatus for implementing functions/actions specified in one or more blocks in the flowcharts and/or the block diagrams. These computer-readable program instructions may also be stored in the computer-readable storage medium, and these instructions allow the computer, the programmable data processing apparatus, and/or another device to operate in a specific method; and therefore, the computer-readable medium having instructions stored therein includes a product that includes instructions for implementing various aspects of the functions/actions specified in one or more blocks in the flowcharts and/or the block diagrams.

The computer-readable program instructions may also be loaded to the computer, the another programmable data processing apparatus, or the another device, such that a series of operating steps are performed on the computer, the another programmable data processing apparatus, or the another device to produce a computer-implemented process, and accordingly, the instructions executed on the computer, the another programmable data processing apparatus, or the another device implement the functions/actions specified in one or more blocks in the flowcharts and/or the block diagrams.

The flowcharts and the block diagrams in the accompanying drawings illustrate the possibly implemented system architectures, functions, and operations of the device, the method, and the computer program product according to the various embodiments of the present disclosure. In this regard, each block in the flowcharts or the block diagrams may represent a module, a program segment, or a portion of code, and the module, the program segment, or the portion of code includes one or more executable instructions for implementing specified logical functions. In some alternative implementations, functions marked in the blocks may also occur in an order different from that marked in the accompanying drawings. For example, two successive blocks may actually be executed in parallel substantially, and sometimes may also be executed in a reverse order, depending on functions involved. It should be further noted that each block in the block diagrams and/or the flowcharts, as well as a combination of the blocks in the block diagrams and/or the flowcharts may be implemented by using a dedicated hardware-based system that executes specified functions or actions, or using a combination of dedicated hardware and computer instructions.

Some example implementations of the present disclosure are listed below.

Example 1. A method for generating a video, including:
  obtaining a visual token for generating an image frame in the video;
  obtaining a control token for constraining position information of an object in the image frame; and
  generating the image frame in the video based on the visual token and the control token, where the object in the image frame satisfies the position information.

Example 2. The method according to Example 1, where the position information is a bounding box, and obtaining a control token for constraining position information of an object in the image frame includes:
  determining a coordinate of the bounding box in the image frame; and
  generating the control token based on the coordinate.

Example 3. The method according to Examples 1 to 2, where generating the control token based on the coordinate includes:
  generating an object identifier for the bounding box based on a color of the bounding box; and
  generating the control token based on the coordinate and the object identifier.

Example 4. The method according to Examples 1 to 3, where generating the control token based on the coordinate and the object identifier includes:
  determining a type of the bounding box, where the type includes a first type that constrains a specific position and a specific size of an object to be generated, and a second type that constrains a position range and a size range of the object to be generated; and
  generating the control token based on the coordinate, the object identifier, and the type.

Example 5. The method according to Examples 1 to 4, where generating the image frame in the video based on the visual token and the control token includes:
  in response to the type of the bounding box being the first type, a center position of the object being consistent with a center position of the bounding box, and a size of the object corresponding to a size of the bounding box; and
  in response to the type of the bounding box being the second type, the center position of the object being within the bounding box, and the size of the object not exceeding the bounding box.

Example 6. The method according to Examples 1 to 5, where generating the control token based on the coordinate, the object identifier, and the type includes:
  generating a plurality of embeddings based on the coordinate, the object identifier, and the type; and
  generating, based on the plurality of embeddings, the control token using a multilayer perceptron.

Example 7. The method according to Examples 1 to 6, where the virtual token belongs to a first set of visual tokens, and generating the image frame in the video based on the visual token and the control token includes:
  generating a second set of visual tokens based on the first set of visual tokens and the control token, where the number of visual tokens in the first set of visual tokens is the same as the number of visual tokens in the second set of visual tokens.

Example 8. The method according to Examples 1 to 7, where the first set of visual tokens and the image frame are generated by a base model, the second set of visual tokens are generated by a motion control module, and the method further includes:
  training the motion control module by adjusting a parameter of the motion control module while fixing parameters of the base model.

Example 9. The method according to Examples 1 to 8, where the motion control module is trained by applying a self-alignment operation, and the self-alignment operation includes:
  generating an identification image frame based on a target bounding box in a training dataset, where the identification image frame includes an identification bounding box that identifies an object constrained by the target bounding box; and
  training the motion control module by aligning the identification bounding box with the target bounding box.

Example 10. The method according to Examples 1 to 9, where training the motion control module by aligning the identification bounding box with the target bounding box includes:
  determining a loss between the identification bounding box and the target bounding box; and training the motion control module by making the loss satisfy a preset condition.

Example 11. The method according to Examples 1 to 10, where training the motion control module by adjusting the parameter of the motion control module while fixing parameters of the base model further includes:
obtaining a first training dataset, where the first training dataset includes a bounding box with the first type; and
training, based on the first training dataset, the motion control module by applying the self-alignment operation.

Example 12. The method according to Examples 1 to 11, where training the motion control module by adjusting the parameter of the motion control module while fixing parameters of the base model further includes:
generating a second training dataset by converting a part of bounding boxes in the first training dataset into bounding boxes with the second type; and
training, based on the second training dataset, the motion control module by applying the self-alignment operation.

Example 13. The method according to Examples 1 to 12, where training the motion control module by adjusting the parameter of the motion control module while fixing parameters of the base model further includes:
training, based on the second training dataset, the motion control module by using a loss for the base model without applying the self-alignment operation.

Example 14. An apparatus for generating a video, including:
a visual token obtaining module, configured to obtain a visual token for generating an image frame in the video;
a control token obtaining module, configured to obtain a control token for constraining position information of an object in the image frame; and
a video image generation module, configured to generate the image frame in the video based on the visual token and the control token, where the object in the image frame satisfies the position information.

Example 15. The apparatus according to Example 14, where the position information is a bounding box, and obtaining a control token for constraining position information of an object in the image frame includes:
a coordinate determination module, configured to determine a coordinate of the bounding box in the image frame; and
a coordinate use module, configured to generate the control token based on the coordinate.

Example 16. The apparatus according to Examples 14 to 15, where generating the control token based on the coordinate includes:
an identifier generation module, configured to generate an object identifier for the bounding box based on a color of the bounding box; and
an identifier use module, configured to generate the control token based on the coordinate and the object identifier.

Example 17. The apparatus according to Examples 14 to 16, where generating the control token based on the coordinate and the object identifier includes:
a type determination module, configured to determine a type of the bounding box, where the type includes a first type that constrains a specific position and a specific size of an object to be generated, and a second type that constrains a position range and a size range of the object to be generated; and
a type use module, configured to generate the control token based on the coordinate, the object identifier, and the type.

Example 18. The apparatus according to Examples 14 to 17, where generating the image frame in the video based on the visual token and the control token includes:
in response to the type of the bounding box being the first type, a center position of the object being consistent with a center position of the bounding box, and a size of the object corresponding to a size of the bounding box; and
in response to the type of the bounding box being the second type, the center position of the object being within the bounding box, and the size of the object not exceeding the bounding box.

Example 19. The apparatus according to Examples 14 to 18, where generating the control token based on the coordinate, the object identifier, and the type includes:
an embedding generation module, configured to generate a plurality of embeddings based on the coordinate, the object identifier, and the type; and
an embedding use module, configured to generate, based on the plurality of embeddings, the control token using a multilayer perceptron.

Example 20. The apparatus according to Examples 14 to 19, where the virtual token belongs to a first set of visual tokens, and generating the image frame in the video based on the visual token and the control token includes:
a visual token generation module, configured to generate a second set of visual tokens based on the first set of visual tokens and the control token, where the number of visual tokens in the first set of visual tokens is the same as the number of visual tokens in the second set of visual tokens.

Example 21. The apparatus according to Examples 14 to 20, where the first set of visual tokens and the image frame are generated by a base model, the second set of visual tokens are generated by a motion control module, and the apparatus further includes:
a motion control training module, configured to train the motion control module by adjusting the parameter of the motion control module while fixing parameters of the base model.

Example 22. The apparatus according to Examples 14 to 21, where the motion control module is trained by applying a self-alignment operation, and the self-alignment operation includes:
an identification frame generation module, configured to generate an identification image frame based on a target bounding box in a training dataset, where the identification image frame includes an identification bounding box that identifies an object constrained by the target bounding box; and
a bounding box alignment module, configured to train the motion control module by aligning the identification bounding box with the target bounding box.

Example 23. The apparatus according to Examples 14 to 22, where training the motion control module by aligning the identification bounding box with the target bounding box includes:
a loss determination module, configured to determine a loss between the identification bounding box and the target bounding box; and
a loss use module, configured to train the motion control module by making the loss satisfy a preset condition.

Example 24. The apparatus according to Examples 14 to 23, where training the motion control module by adjusting a parameter of the motion control module while fixing parameters of the base model further includes:
   a first training set obtaining module, configured to obtain a first training dataset, where the first training dataset includes a bounding box with the first type; and
   a first training set use module, configured to train, based on the first training dataset, the motion control module by applying the self-alignment operation.

Example 25. The apparatus according to Examples 14 to 24, where training the motion control module by adjusting the parameter of the motion control module while fixing parameters of the base model further includes:
   a second training set obtaining module, configured to generate a second training dataset by converting a part of bounding boxes in the first training dataset into bounding boxes with the second type; and
   a second training set use module, configured to train, based on the second training dataset, the motion control module by applying the self-alignment operation.

Example 26. The apparatus according to Examples 14 to 25, where training the motion control module by adjusting the parameter of the motion control module while fixing parameters of the base model further includes:
   a third training set use module, configured to train, based on the second training dataset, the motion control module by using a loss for the base model without applying the self-alignment operation.

Example 27. An electronic device, including:
   a processor; and
   a memory coupled with the processor, where the memory has instructions stored therein, the instructions, when executed by the processor, cause the electronic device to perform actions, and the actions include:
   obtaining a visual token for generating an image frame in the video;
   obtaining a control token for constraining position information of an object in the image frame; and
   generating the image frame in the video based on the visual token and the control token, where the object in the image frame satisfies the position information.

Example 28. The device according to Example 27, where obtaining a control token for constraining a bounding box of an object in the image frame includes:
   determining a coordinate of the bounding box in the image frame; and
   generating the control token based on the coordinate.

Example 29. The device according to Examples 27 to 28, where generating the control token based on the coordinate includes:
   generating an object identifier for the bounding box based on a color of the bounding box; and
   generating the control token based on the coordinate and the object identifier.

Example 30. The device according to Examples 27 to 29, where generating the control token based on the coordinate and the object identifier includes:
   determining a type of the bounding box, where the type includes a first type that constrains a specific position and a specific size of an object to be generated, and a second type that constrains a position range and a size range of the object to be generated; and
   generating the control token based on the coordinate, the object identifier, and the type.

Example 31. The device according to Examples 27 to 30, where generating the image frame in the video based on the visual token and the control token includes:
   in response to the type of the bounding box being the first type, a center position of the object being consistent with a center position of the bounding box, and a size of the object corresponding to a size of the bounding box; and
   in response to the type of the bounding box being the second type, the center position of the object being within the bounding box, and the size of the object not exceeding the bounding box.

Example 32. The device according to Examples 27 to 31, where generating the control token based on the coordinate, the object identifier, and the type includes:
   generating a plurality of embeddings based on the coordinate, the object identifier, and the type; and
   generating, based on the plurality of embeddings, the control token using a multilayer perceptron.

Example 33. The device according to Examples 27 to 32, where the virtual token belongs to a first set of visual tokens, and generating the image frame in the video based on the visual token and the control token includes:
   generating a second set of visual tokens based on the first set of visual tokens and the control token, where the number of visual tokens in the first set of visual tokens is the same as the number of visual tokens in the second set of visual tokens.

Example 34. The device according to Examples 27 to 33, where the first set of visual tokens and the image frame are generated by a base model, the second set of visual tokens are generated by a motion control module, and the device further includes:
   training the motion control module by adjusting a parameter of the motion control module while fixing parameters of the base model.

Example 35. The device according to Examples 27 to 34, where the motion control module is trained by applying a self-alignment operation, and the self-alignment operation includes:
   generating an identification image frame based on a target bounding box in a training dataset, where the identification image frame includes an identification bounding box that identifies an object constrained by the target bounding box; and
   training the motion control module by aligning the identification bounding box with the target bounding box.

Example 36. The device according to Examples 27 to 35, where training the motion control module by aligning the identification bounding box with the target bounding box includes:
   determining a loss between the identification bounding box and the target bounding box; and
   training the motion control module by making the loss satisfy a preset condition.

Example 37. The device according to Examples 27 to 36, where training the motion control module by adjusting the parameter of the motion control module while fixing parameters of the base model further includes:
   obtaining a first training dataset, where the first training dataset includes a bounding box with the first type; and
   training, based on the first training dataset, the motion control module by applying the self-alignment operation.

Example 38. The device according to Examples 27 to 37, where training the motion control module by adjusting the parameter of the motion control module while fixing parameters of the base model further includes:

generating a second training dataset by converting a part of bounding boxes in the first training dataset into bounding boxes with the second type; and training, based on the second training dataset, the motion control module by applying the self-alignment operation.

Example 39. The device according to Examples 27 to 38, where training the motion control module by adjusting the parameter of the motion control module while fixing parameters of the base model further includes:

training, based on the second training dataset, the motion control module by using a loss for the base model without applying the self-alignment operation.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of the terms as used herein is intended to best explain the principles and practical applications of the various embodiments, or improvements to technologies on the market, or to allow other persons of ordinary skill in the art to understand the various embodiments disclosed herein.

The invention claimed is:

1. A method for generating a video, comprising:
   obtaining, by a device, a visual token for generating an image frame in the video;
   obtaining, by the device, a control token for constraining position information of an object in the image frame, the control token being generated, by the device, based on a bounding box or a motion trajectory and indicating motion control information for the object, wherein the bounding box or the motion trajectory is provided by a user for constraining a position of the object in the image frame to be generated; and
   generating, by a video generation model with a motion control module deployed on the device, the image frame in the video based on the visual token and the control token, wherein the object in the image frame satisfies the position information,
   wherein the visual token is a first visual token, and generating the image frame in the video based on the visual token and the control token comprises:
       generating, by the motion control module, a second visual token based on the first visual token and the control token, the second visual token comprising motion control information provided by the bounding box or the motion trajectory; and
       generating the image frame in the video based on the second visual token.

2. The method according to claim 1, wherein obtaining the control token for constraining the position information of the object in the image frame comprises:
   determining a coordinate of the bounding box in the image frame; and
   generating the control token based on the coordinate.

3. The method according to claim 2, wherein generating the control token based on the coordinate comprises:
   generating an object identifier for the bounding box based on a color of the bounding box; and
   generating the control token based on the coordinate and the object identifier.

4. The method according to claim 3, wherein generating the control token based on the coordinate and the object identifier comprises:
   determining a type of the bounding box, wherein the type comprises a first type constraining a specific position and a specific size of an object to be generated, and a second type constraining a position range and a size range of the object to be generated; and
   generating the control token based on the coordinate, the object identifier, and the type.

5. The method according to claim 4, wherein generating the image frame in the video based on the visual token and the control token comprises:
   in response to a type of the bounding box being the first type, a center position of the object being consistent with a center position of the bounding box, and a size of the object corresponding to a size of the bounding box; and
   in response to the type of the bounding box being the second type, the center position of the object being within the bounding box, and the size of the object not exceeding the bounding box.

6. The method according to claim 5, wherein generating the control token based on the coordinate, the object identifier, and the type comprises:
   generating a plurality of embeddings based on the coordinate, the object identifier, and the type; and
   generating, based on the plurality of embeddings, the control token using a multilayer perceptron.

7. The method according to claim 5, wherein the visual token belongs to a first set of visual tokens, and generating the image frame in the video based on the visual token and the control token comprises:
   generating a second set of visual tokens based on the first set of visual tokens and the control token, wherein a number of visual tokens in the first set of visual tokens is the same as a number of visual tokens in the second set of visual tokens.

8. The method according to claim 7, wherein the first set of visual tokens and the image frame are generated by a base model, the second set of visual tokens are generated by the motion control module, and the method further comprises:
   training the motion control module by adjusting a parameter of the motion control module while fixing parameters of the base model.

9. The method according to claim 8, wherein the motion control module is trained by applying a self-alignment operation, and the self-alignment operation comprises:
   generating an identification image frame based on a target bounding box in a training dataset, wherein the identification image frame comprises an identification bounding box that identifies an object constrained by the target bounding box; and
   training the motion control module by aligning the identification bounding box with the target bounding box.

10. The method according to claim 9, wherein training the motion control module by aligning the identification bounding box with the target bounding box comprises:
    determining a loss between the identification bounding box and the target bounding box; and
    training the motion control module by making the loss satisfy a preset condition.

11. The method according to claim 9, wherein training the motion control module by adjusting the parameter of the motion control module while fixing the parameters of the base model further comprises:
    obtaining a first training dataset, wherein the first training dataset comprises a bounding box with the first type; and training, based on the first training dataset, the motion control module by applying the self-alignment operation.

12. The method according to claim 11, wherein training the motion control module by adjusting the parameter of the motion control module while fixing the parameters of the base model further comprises:
generating a second training dataset by converting a part of bounding boxes in the first training dataset into bounding boxes with the second type; and
training, based on the second training dataset, the motion control module by applying the self-alignment operation.

13. The method according to claim 12, wherein training the motion control module by adjusting the parameter of the motion control module while fixing the parameters of the base model further comprises:
training, based on the second training dataset, the motion control module by using a loss for the base model without applying the self-alignment operation.

14. An electronic device, comprising:
a processor; and
a memory coupled with the processor, wherein the memory has instructions stored therein, and the instructions, when executed by the processor, cause the electronic device to:
obtain a visual token for generating an image frame in a video;
obtain a control token for constraining position information of an object in the image frame, the control token being generated, by the electronic device, based on a bounding box or a motion trajectory and indicating motion control information for the object, wherein the bounding box or the motion trajectory is provided by a user for constraining a position of the object in the image frame to be generated; and
generate, by a video generation model with a motion control module deployed on the electronic device, the image frame in the video based on the visual token and the control token, wherein the object in the image frame satisfies the position information,
wherein the visual token is a first visual token, and generating the image frame in the video based on the visual token and the control token comprises:
generating, by the motion control module, a second visual token based on the first visual token and the control token, the second visual token comprising motion control information provided by the bounding box or the motion trajectory; and
generating the image frame in the video based on the second visual token.

15. The electronic device according to claim 14, wherein the instructions causing the electronic device to obtain the control token for constraining the position information of the object in the image frame comprise instructions causing the electronic device to:
determine a coordinate of the bounding box in the image frame; and
generate the control token based on the coordinate.

16. The electronic device according to claim 15, wherein the instructions causing the electronic device to generate the control token based on the coordinate comprise instructions causing the electronic device to:
generate an object identifier for the bounding box based on a color of the bounding box; and
generate the control token based on the coordinate and the object identifier.

17. The electronic device according to claim 16, wherein the instructions causing the electronic device to generate the control token based on the coordinate and the object identifier comprise instructions causing the electronic device to:
determine a type of the bounding box, wherein the type comprises a first type constraining a specific position and a specific size of an object to be generated, and a second type constraining a position range and a size range of the object to be generated; and
generate the control token based on the coordinate, the object identifier, and the type.

18. The electronic device according to claim 17, wherein the instructions causing the electronic device to generate the image frame in the video based on the visual token and the control token comprise instructions causing the electronic device to:
determine a center position of the object and a size of the object, wherein:
in response to a type of the bounding box being the first type, the center position of the object is consistent with a center position of the bounding box, and the size of the object corresponds to a size of the bounding box; and
in response to the type of the bounding box being the second type, the center position of the object is within the bounding box, and the size of the object does not exceed the bounding box.

19. The electronic device according to claim 18, wherein the instructions causing the electronic device to generate the control token based on the coordinate, the object identifier, and the type comprise instructions causing the electronic device to:
generate a plurality of embeddings based on the coordinate, the object identifier, and the type; and
generate, based on the plurality of embeddings, the control token using a multilayer perceptron.

20. A computer program product, wherein the computer program product is tangibly stored on a non-transitory computer-readable medium and comprises machine-executable instructions, and the machine-executable instructions, when executed, cause a machine to:
obtain a visual token for generating an image frame in a video;
obtain a control token for constraining position information of an object in the image frame, the control token being generated, by the machine, based on a bounding box or a motion trajectory and indicating motion control information for the object, wherein the bounding box or the motion trajectory is provided by a user for constraining a position of the object in the image frame to be generated; and
generate, by a video generation model with a motion control module deployed on the machine, the image frame in the video based on the visual token and the control token, wherein the object in the image frame satisfies the position information,
wherein the visual token is a first visual token, and generating the image frame in the video based on the visual token and the control token comprises:
generating, by the motion control module, a second visual token based on the first visual token and the control token, the second visual token comprising motion control information provided by the bounding box or the motion trajectory; and generating the image frame in the video based on the second visual token.

* * * * *